(12) United States Patent
Ajmera et al.

(10) Patent No.: US 9,044,023 B2
(45) Date of Patent: Jun. 2, 2015

(54) SYSTEM AND METHOD FOR PREPARING NAAN BREAD

(75) Inventors: Sam Ajmera, Maple (CA); John Gordon, Markham (CA); Dragan Janus, Concord (CA)

(73) Assignee: FGF BRANDS INC., Concord, Ontario (CA)

(*) Notice: Subject to any disclaimer, the term of this patent is extended or adjusted under 35 U.S.C. 154(b) by 0 days.

(21) Appl. No.: 13/040,790

(22) Filed: Mar. 4, 2011
(Under 37 CFR 1.47)

(65) Prior Publication Data
US 2011/0151052 A1    Jun. 23, 2011

Related U.S. Application Data

(62) Division of application No. 12/310,827, filed as application No. PCT/CA2006/001612 on Sep. 29, 2006.

(51) Int. Cl.
| | |
|---|---|
| A47J 39/00 | (2006.01) |
| A21D 6/00 | (2006.01) |
| A23C 3/00 | (2006.01) |
| A21B 1/48 | (2006.01) |
| A23L 3/18 | (2006.01) |
| A47J 37/04 | (2006.01) |
| A47J 37/07 | (2006.01) |
| A23G 9/04 | (2006.01) |
| H05B 6/78 | (2006.01) |
| A21D 8/02 | (2006.01) |
| A21D 13/00 | (2006.01) |

(52) U.S. Cl.
CPC ... *A21B 1/48* (2013.01); *A21D 8/02* (2013.01); *A21D 13/00* (2013.01)

(58) Field of Classification Search
CPC .............. A21B 1/48; A21D 8/02; A21D 13/00
USPC ......................................................... 426/503
See application file for complete search history.

(56) References Cited

U.S. PATENT DOCUMENTS

| | | | |
|---|---|---|---|
| 980,680 | A | 1/1911 | Ross |
| 1,711,143 | A | 4/1929 | Gloekler |

(Continued)

FOREIGN PATENT DOCUMENTS

| | | |
|---|---|---|
| AU | 580536 B3 | 3/1988 |
| CA | 1148815 A | 6/1983 |

(Continued)

OTHER PUBLICATIONS

Spiritual Practice—KRSNA Prasadam Available online at www.harekrsna.com on May 15, 2005.*

(Continued)

*Primary Examiner* — Rena L Dye
*Assistant Examiner* — Assaf Zilbering
(74) *Attorney, Agent, or Firm* — McDonnell Boehnen Hulbert & Berghoff LLP

(57) ABSTRACT

A method and system for preparing naan bread is provided. A conveyor oven is used to bake flattened and pre-shaped naan bread loaves. The conveyor oven uses high temperature gas heat to bake the naan, imparting traditional characteristics such as the slightly smoky or scorched appearance. The oven interior is preferably lined with stone, granite, clay or porcelain to enhance baking and provide traditional flavor.

9 Claims, 9 Drawing Sheets

(56) References Cited

U.S. PATENT DOCUMENTS

| | | | |
|---|---|---|---|
| 2,305,056 A | | 12/1942 | Austin |
| 3,088,396 A | | 5/1963 | Proffitt |
| 3,357,475 A | | 12/1967 | Schweitzer |
| 3,861,378 A | | 1/1975 | Rhoads et al. |
| 3,993,788 A | | 11/1976 | Longenecker |
| 4,023,007 A | | 5/1977 | Brown |
| 4,045,166 A | | 8/1977 | Kaleel |
| 4,188,868 A | | 2/1980 | Baker et al. |
| 4,202,911 A | | 5/1980 | Papantoniou et al. |
| 4,252,055 A | | 2/1981 | Johansson et al. |
| 4,383,823 A | | 5/1983 | Williams et al. |
| 4,389,562 A | | 6/1983 | Chaudoir |
| 4,462,307 A | | 7/1984 | Wells |
| 4,504,221 A | | 3/1985 | Hartmann |
| 4,542,268 A | | 9/1985 | Jarvis et al. |
| 4,591,333 A | | 5/1986 | Henke |
| 4,599,938 A | | 7/1986 | Gongwer |
| 4,739,154 A | | 4/1988 | Bharara et al. |
| 4,951,648 A | | 8/1990 | Shukla et al. |
| 5,512,312 A | * | 4/1996 | Forney et al. ............ 426/523 |
| 5,686,004 A | | 11/1997 | Schneider |
| 5,826,496 A | | 10/1998 | Jara |
| 5,832,810 A | | 11/1998 | Brawley, Sr. et al. |
| 5,979,302 A | | 11/1999 | Funk et al. |
| 6,291,002 B1 | | 9/2001 | Goglanian |
| 6,425,388 B1 | | 7/2002 | Korinchock |
| 6,550,373 B2 | | 4/2003 | Hafezan et al. |
| 6,707,014 B1 | | 3/2004 | Corey et al. |
| 6,776,612 B2 | | 8/2004 | Backowski et al. |
| 6,822,207 B2 | * | 11/2004 | Schmidt ............ 219/700 |
| 6,933,473 B2 | | 8/2005 | Henke et al. |
| 7,026,579 B2 | | 4/2006 | Burtea |
| 7,091,452 B2 | | 8/2006 | Kingdon et al. |
| 2003/0041851 A1 | | 3/2003 | Kingdon et al. |
| 2003/0066204 A1 | * | 4/2003 | Dillender ............ 34/105 |
| 2003/0196346 A1 | | 10/2003 | Schmidt |
| 2005/0235980 A1 | | 10/2005 | Hansen et al. |
| 2007/0006865 A1 | | 1/2007 | Wiker et al. |
| 2011/0020492 A1 | | 1/2011 | Ajmera et al. |
| 2012/0040066 A1 | | 2/2012 | Ajmera et al. |
| 2012/0189743 A1 | | 7/2012 | Ajmera et al. |
| 2012/0270171 A1 | | 10/2012 | Ajmera et al. |

FOREIGN PATENT DOCUMENTS

| | | | |
|---|---|---|---|
| CA | 2210967 A1 | | 1/1998 |
| CA | 2343881 A1 | | 10/2000 |
| DE | 2107220 A1 | | 8/1972 |
| FR | 2398459 | | 2/1979 |
| FR | 2565068 A1 | | 12/1985 |
| GB | 2290448 A | * | 1/1996 |
| IN | 139746 A1 | | 7/1976 |
| IN | 145178 A1 | | 9/1977 |
| WO | 82/02475 A1 | | 8/1982 |
| WO | 88/01719 A1 | | 3/1988 |
| WO | 98/15185 A1 | | 4/1998 |

OTHER PUBLICATIONS

Webster's Definition—Naan Available online at www.websters-online-dictionary.org on Jun. 17, 2005.*

Taste of Life Available online at www.tasteoflife.com on Sep. 30, 2002.*

Indian Food Forever—Naan Bread Recipe. Available online at www.indanfoodforever.com on Jul. 29, 2005.*

"The Fabulous Indian Breads". Available online at www.angelfire.com on Dec. 15, 2005.*

"Benefits of a Spiral Systems". Available online at www.spiralsystems.com on Jun. 7, 2002.*

Restaurants & Institutions, Apr. 1, 1995, pp. 58-76, "Authentic Ethnics", by Johnson.

Food Manufacture, Feb. 2000, pp. 38-39, "Naan Bread Revolution", Darrington, H.

Restaurants & Institutions, Apr. 1, 1995 (Jan. 4, 1995), pp. 62-76, "Authentic Ethnics India: Spices Provide India with a Wealth of Flavorings Known to no other culinary repertoire", Johnson, B. A.

Baking & Snack, Dec. 1996, vol. 18, No. 11, pp. 46-52, "The facts about flat bread processing", Gorton, L.

British Baker, Sep. 21, 2001, pp. 18-24, "Tunnel Ovens: Winning the space race".

http://en.wikipedia.org/wiki/Tandoor, definition of "Tandoor", Sep. 19, 2006.

http://en.wikipedia.org/wiki/Naan, definition of "Naan", Sep. 19, 2006.

California Conference of Director of Environmental Health, Jul. 1999, "Guidelines for the Installation and Use of Tandoor Ovens", pp. 1-3.

www.beechovens.com, "Beech Ovens: Reinventing Tandoori Technology", (Sep. 19, 2006), pp. 1-8.

www.beechovens.com.au/index.php?pg=tan, "Beech Ovens: Manufacturer of Wood Fired Ovens and Gas Stone Hearth Ovens for the World's Leading Hoteliers", Sep. 19, 2006, copyright 1999-2006, pp. 1-6.

International Search Report dated Jun. 13, 2007 in corresponding foreign patent application PCT/CA2006/001612.

Written Opinion of the International Searching Authority dated Dec. 3, 2008 in co-pending foreign application CA2008/001316.

International Preliminary Report on Patentability issued Jan. 18, 2011 in co-pending foreign application PCT/CA2008/001316.

Written Opinion of the International Searching Authority dated Apr. 15, 2009 in co-pending foreign application PCT/CA2008/001317.

International Preliminary Report on Patentabiity issued Jan. 18, 2011 in co-pending foreign application PCT/CA2008/001317.

International Search Report dated Dec. 3, 2008 in co-pending foreign application PCT/CA2008/0001316.

International Search Report dated Apr. 15, 2009 in co-pending foreign application PCT/CA2008/0001317.

UK Communication dated May 23, 2011 in corresponding foreign patent application No. GB0820448.9, 1 page.

Mewburn Ellis 3dP Observations, dated May 13, 2011, 19 pages, regarding corresponding foreign patent application No. GB0820448.9.

Prepared Foods, Oct. 2006, pp. 11-18, "'Naan' too Soon", Roberts, W.A.

The Globe and Mail, Oct. 9, 2006, 3 pages, "The world is flatbread for bakery behind PC naan", Strauss, M.

U.S. Appl. No. 78949769, http://tess2.uspto.gov/bin/showfield?f=doc&state=4008:b3s5sk.2.1, accessed Apr. 15, 2011.

The Best Recipe, by the editors of Cook's Illustrated, 1999, pp. 333-337.

Office Action dated Jul. 21, 2011 in corresponding U.S. Appl. No. 12/310,827.

Final Rejection mailed Sep. 26, 2012 in corresponding U.S. Appl. No. 12/310,827.

Office Action—Restriction—mailed Apr. 2, 2013 in co-pending U.S. Appl. No. 13/054,241.

Recipetips.com, Naan Bread, Definition and Cooking Information, www.recipetips.com/glossary-term/t-34773/naan-bread.asp, , 2 pages, Apr. 10, 2004.

International Preliminary Report on Patentability issued Mar. 31, 2009 in corresponding PCT application No. PCT/CA2006/001612.

Office Action mailed Dec. 18, 2012 in corresponding U.S. Appl. No. 13/432,795.

Office Action mailed Jun. 26, 2013 in co-pending U.S. Appl. No. 13/054,241.

Meredith, P.G. et al. "Fracture Toughness and Subcritical Crack Growth During High-Temperature Tensile Deformation of Westerly Granite and Black Gabbro," Physics of the Earth and Planetary Interiors, 39 (1985) 33-51. Elsevier Science Publishers B.V., Amsterdam.

Fredrich et al. "Micromechanics of Thermally Induced Cracking in Three Crystal Rocks," Journal of Geophysical Research, vol. 91, No. B12, p. 12,743-12,744. Nov. 10, 1986.

Wang, et al. "Thermal Stress Cracking in Granite," Journal of Geophysical Research, vol. 94, No. B2, p. 1745-1758. Feb. 10, 1989.

(56) References Cited

OTHER PUBLICATIONS

Atwell, William A., "Chapter 6, Products From Hard Wheat Flour: Problems, Causes, and Resolutions," in: Wheat Flour, (Eagan Press Handbook Series, 2001), pp. 79-95.

C.H. Babb Co., Inc., "For Mideast Bread Ovens or Fully Automated Bakery Systems," brochure, allegedly available as of 2004.

Captures of C.H. Babb Co., Inc. website from 2004 [WaybackMachine], [retrieved on Aug. 19, 2013]. Retrieved from the Internet <URL: web.archive.org/web/20040206203406/http://babbco.com/ovens.html>.

Food Machinery Engineering Brochure, "Arabic Bread Oven Model K-174," (unknown date).

Khurana, Laxmi, "An Indian Housewife's Recipe Book," Jaico Publishing House, 1996, pp. 12-13.

Qarooni, Jalal, "Flat Bread Technology," International Thomson Publishing, pp. 98-101, 194-201, 1996.

Rai, Ranjit, "Construction of the Tandoor" and "Tenderizers" in: Tandoor: The Great Indian Barbeque, (Overlook Press, 2001), pp. 104-105.

The Tile Man Inc., "Vintage Tile Pattern," [retrieved on Apr. 20, 2005]. Retrieved from the Internet <URL: http://www.thetileman.com/vintage.html>.

* cited by examiner

SYSTEM AND METHOD FOR PREPARING NAAN BREAD

This application is a divisional of U.S. Ser. No. 12/310,827 filed Apr. 27, 2010, which is a 371 of PCT/CA2006/001612 filed Sep. 29, 2006, the disclosures of which are incorporated herein by reference.

FIELD OF THE INVENTION

A system and method is provided for preparing naan bread.

BACKGROUND OF THE INVENTION

Naan is a type of flatbread traditionally made in Central and South Asia and now enjoyed worldwide, especially as an accompaniment to Indian foods, such as curries. It is made from a leavened dough that is flattened and baked in a cylindrical or urn-shaped oven known as a tandoor.

A traditional tandoor consisted of a clay baking layer encased in a masonry or earth housing. An insulating layer of sand was provided between the clay layer and the housing. The tandoor was heated by charcoal or wood burned in the bottom of the baking chamber.

To bake naan breads in a traditional tandoor, pieces of flattened dough were slapped by hand or baking pad onto the extremely hot inside walls of the oven. A hook was used to remove the baked naan after a short baking time.

The basic process for baking naan has not changed for centuries. Modern tandoor ovens use different materials (such as steel housings and ceramic interiors) and different heating options (such as electric heating elements or gas burners). However, the basic shape of the tandoor, and the vertical wall-based baking process have not changed.

In spite of improvements in materials, many purists believe that there is no substitute for the flavour imparted by baking naan with a traditional stone or clay oven. However, the traditional tandoor design has a number of drawbacks—material issues and poor safety. Naan must be baked at very high temperatures to impart the sultry smoky characteristic that is its signature. Clay ovens, in particular, are known to crack under prolonged exposure to high heat. Cracks can cause the traditional sand fill that is used to insulate the oven to leak into the baking chamber, potentially getting into the food. It is seldom possible to effectively patch a clay oven once it cracks. Accordingly, it becomes necessary at regular intervals to replace a tandoor oven.

Traditional baking methods are also dangerous even for skilled operators. The inside of the tandoor oven reaches temperatures often in excess of 700° F. (370° C.). In order to slap the raw naan dough onto the inside walls of the tandoor, the operator must stick a portion of his arm into the oven. Any slight contact with the walls of the tandoor can result in severe burns. The top openings of the oven are often relatively small (approximately 1-2 ft across, or approximately 30-60 cm), increasing the difficulty to maneuver the bread into place without contacting the oven surfaces.

In a traditional tandoor, a baker can only bake a small number of naan at a time due to the small size of most tandoor ovens and due to the quick baking process requiring constant human involvement and attention. Consequently, a tandoor operator bakes a steady stream of tiny batches of breads for "à la minute" serving and consumption.

However, these traditional naan baking processes do not lend themselves readily to larger commercial scale production. Accordingly, naan is largely considered a bread for restaurant consumption, and not a food purchased to consume at home. Home cooks, unless they have access to a tandoor, are not likely to be able to enjoy hot naan bread with a meal. Methods of cooking naan in an electric or gas home oven have been suggested, but such methods are generally considered to produce an inferior product as home ovens are simply not hot enough to mimic a tandoor.

A need therefore exists for a method of preparing naan that allows for commercial-scale production, using safe modern equipment, without sacrificing the traditional flavour and texture of a tandoor-baked naan.

SUMMARY OF THE INVENTION

According to a first aspect of the invention, a method of making naan bread is provided. Naan bread is prepared by:
(a) preparing a naan bread dough;
(b) dividing and forming the dough into balls;
(c) rising the round balls of dough;
(d) flattening the round balls into generally circular discs;
(e) stretching each disc into an irregular non-circular shaped loaf;
(f) loading the shaped loaves onto a conveyor; and
(g) running the conveyor through a high temperature gas oven for a period of time sufficient to bake the loaves to a crisp-chewy consistency, having a visibly bubbled surface texture and a slightly scorched top surface.

Preferably, the oven temperature is at least 700° F. Preferably, the conveyor speed is approximately 60 feet/min and the resident oven time for each loaf is between approximately 20-50 seconds.

At least part of the dough may be coated with an oil or fat prior to baking.

The stretching step in step (e) is preferred for making a more-authentically shaped naan bread. Preferably, the stretching is done by hand, for instance to form the dough into a teardrop, or oblong shape. Preferably, each loaf may be shaped into a unique shape. At step (e), other shaping or prepping may be performed, for instance, the dough may be stretched the dough and/or pressed to impart deliberate unevenness over areas of the surface.

Preferably, the thickness of the round discs following step (d) is between approximately 2-5 mm. Preferably, the thickness of the shaped loaves following step (e) is between approximately 1.5-3 mm.

Various methods may be used to rise the dough before the pressing and shaping steps. A steam proofer may be used. Preferably, the balls of dough may be conveyed during the rising step on a conveyor tray proofer.

Depending on the humidity and temperature (an acceptable range being within the general knowledge of those skilled in the art), the balls of dough may be left to rise for between approximately 45 and approximately 60 minutes.

Prior to rising, the balls of dough may be pre-weighed for approximately even weight.

Various dough formulations are possible. The dough is preferably a leavened dough, such as a yeast-leavened dough or a baking powder-leavened dough. Alternatively, the dough may comprises a sour dough. In any of these formulations, the dough may contain a souring ingredient.

Preferably, the dough is baked by employing heating sources above and below the loaves. After baking, the loaves may be cooled and packaged to be sold as re-heatable naan bread. The cooling step may employ a cooling spiral.

According to a second aspect of the invention, a naan bread is provided, which is made by the foregoing method.

According to a third aspect of the invention, a conveyor-oven baked naan bread is provided having a crisp-chewy consistency, a visibly bubbled surface texture and a slightly scorched top surface.

According to a fourth aspect of the invention, a naan bread making system is provided, comprising:
- a naan bread dough preparing station for:
  - preparing a naan bread dough;
  - dividing and forming the dough into round balls; and
  - rising the round balls of dough;
- a loaf shaping station for:
  - flattening the round balls of dough into generally circular discs; and
  - stretching each disc into an irregular non-circular shaped loaf; and
- a conveyor oven station for:
  - baking the shaped loaves by running the shaped loaves on a conveyor through a high temperature gas oven for a period of time sufficient to produce baked naan breads each having a crisp-chewy consistency, a visibly bubbled surface texture and a slightly scorched top surface.

Preferably, the oven's interior surface has at least a portion made from stone, granite, clay or porcelain. According to the system, the bread may be allowed to contact the portion of the interior surface made of stone, granite, clay or porcelain as it bakes.

Preferably, the oven has top and bottom heating sources, for baking the bread from above and below, and for imparting a scorched appearance to parts of the bread. The top heating source may be located approximately 15 to 30 cm from the conveyor. The top and bottom heating sources may comprise a gas burner. The burner does not touch the bread as it is baking. The burner may be angled to indirectly bake the bread moving on the conveyor.

The oven housing may be composed of:
- an exterior steel shell;
- an interior baking cavity lined at least in part with stone, granite, clay or porcelain; and
- an intermediate insulating layer between the shell and the baking cavity, comprising sand-filled panels and loosely packed rock wool.

Preferably, the oven housing is tunnel shaped and a conveyor passes through the tunnel. Preferably, the tunnel is a linear tunnel, having a dough entry portion that is separate from and located away from a baked bread exit portion.

The system may further include a cooling and packaging station for cooling naan breads from the oven and packaging the breads for refrigerated or frozen storage prior to consumption in a re-heated form.

The system is preferably adapted for preparing up to 8000 breads per hour.

DETAILED DESCRIPTION OF THE FIGURES

Figure 1A:
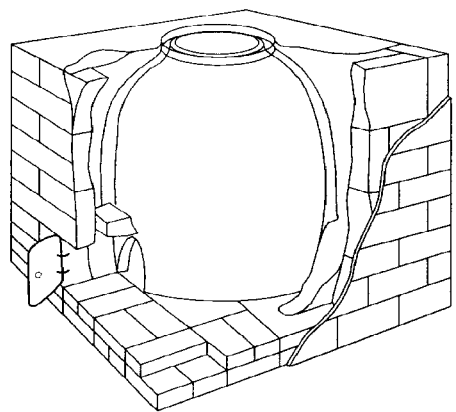
FIG. 1A is a diagram of a traditional tandoor oven (prior art) showing the housing in cutaway to reveal the clay baking chamber.
Figure 1B:
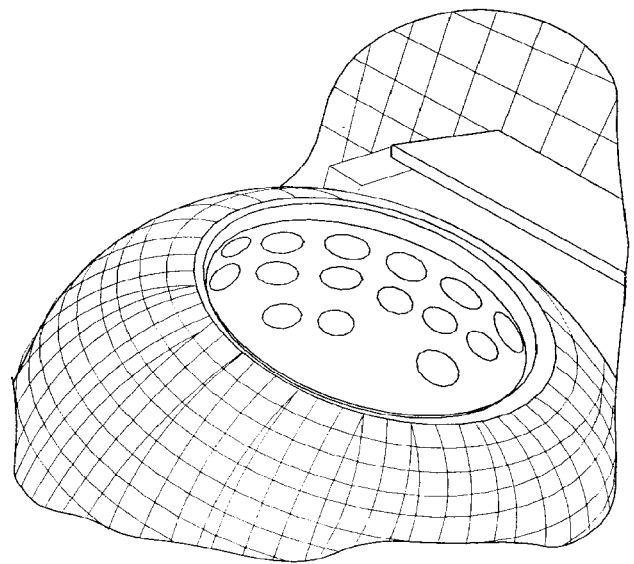
FIG. 1B is a diagram of a traditional tandoor oven (prior art) showing naan breads baking on the inside walls.

As shown in FIGS. 1A and 1B, the traditional tandoor oven (which is still widely used) consists of a cylindrical or urn-shaped structure with fuel placed in the bottom. The baking surfaces are actually the walls of the tandoor. Bread dough is slapped onto the inside walls where it bakes in this peculiar vertical "hanging" fashion with the heat of the wall surface and where it is perfumed by the smoky hot air from the burning charcoal or wood. Baked naans are removed by hook from the wall. The baking time is short (approximately 1-2 minutes). An operator tends to the oven producing many small batches of bread. Still, a skilled naan baker may only be able to produce about 90 naan in an hour.

Figure 7:
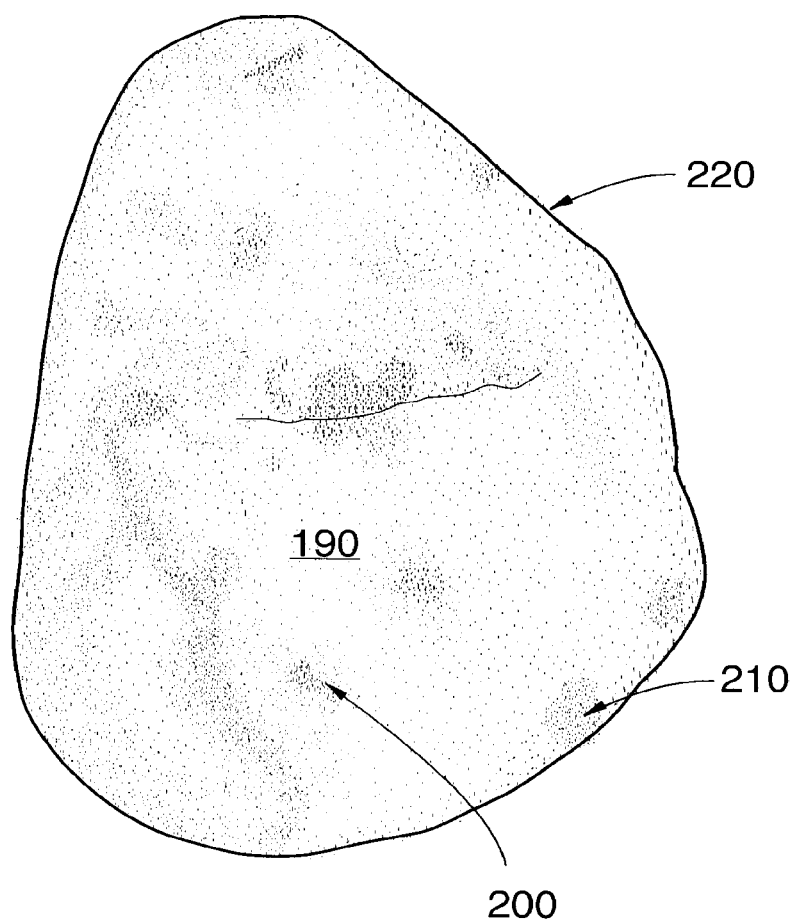
FIG. 7 is a view of a finished baked naan, showing bubbled surface and classic scorch marks.

Baked naan has a characteristic appearance and texture. A sample illustration of the naan baked according to the present invention is shown in FIG. 7. The surface has a bubbled appearance, and the bread may have characteristic smudges or scorched areas. Traditionally, naan bread is shaped by hand and an uneven, rustic appearance is considered desirable. This also provides contrasts in texture as parts of the baked bread may be thicker and chewier, while other parts may be thin and cracker-ish.

In accordance with traditional recipes, naan is produced from a soft wheat flour dough, which may be yeast- or baking powder-leavened. It may be prepared using water or milk (or a combination). A souring ingredient may be used to promote bubbling in the dough. Flavouring and conditioning ingredients may be added (such as buttermilk, garlic and cilantro). Before or after baking, the dough may be oiled or brushed with ghee (clarified butter).

As an illustrative example, a naan bread dough may be made according to the following formula:
- flour—53 wt-%
- sugar—2.5 wt-%
- baking powder—1.45 wt-%
- salt—1.4 wt-%
- yeast—0.05 wt-%
- water—14 wt-%
- liquid egg—2.5 wt-%
- buttermilk—23 wt-%
- butter ghee—0.75 wt-%
- oil—2 wt-%.

This is merely one possible formulation. It will be understood by persons skilled in the art that other combinations of flour, liquid and leavening (with or without additional fats, sugars, and flavour additives) are possible.

Figure 2:
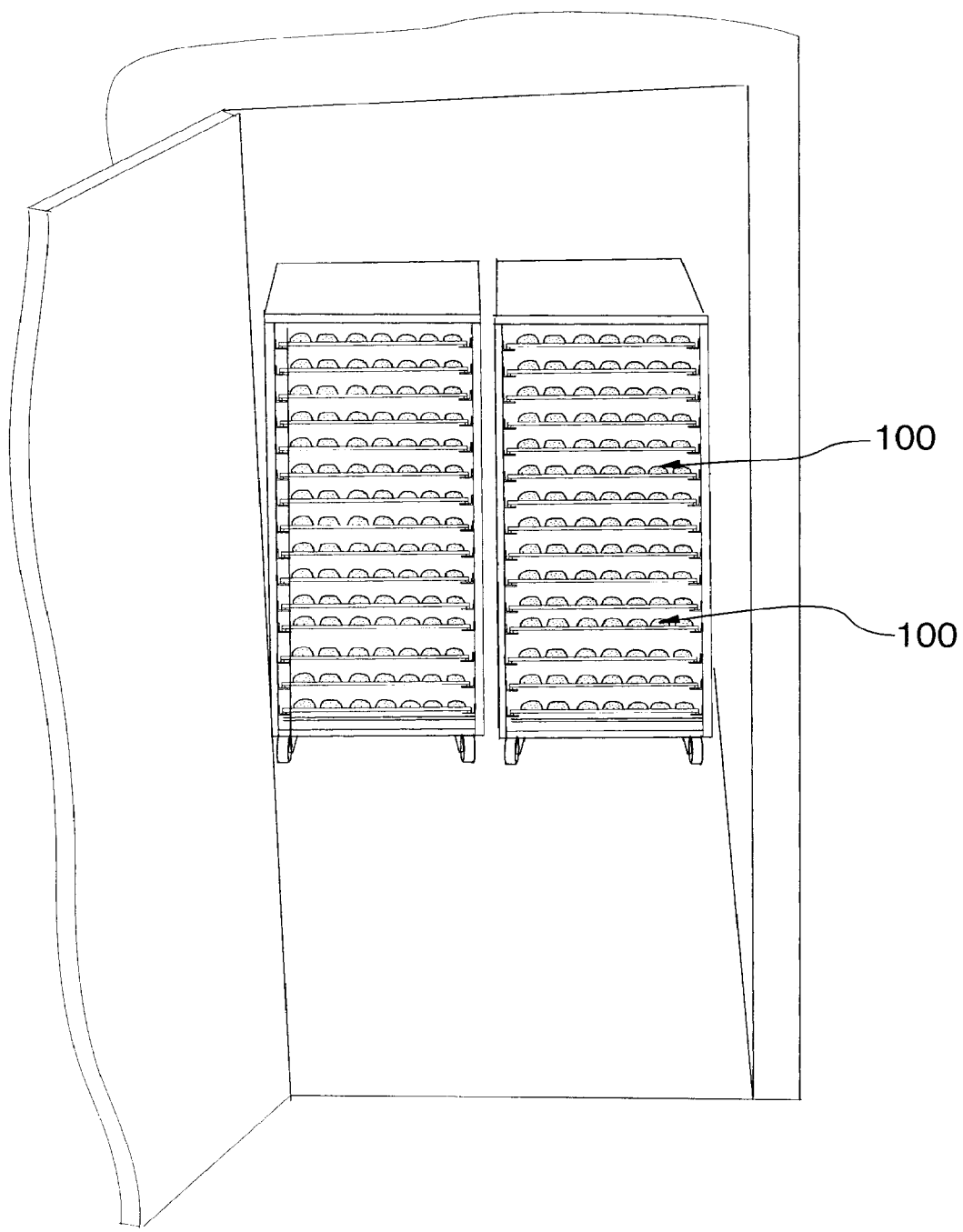
FIG. 2 is a view of a rack of naan dough balls rising before the baking process.

A commercial horizontal dough mixer may be used to bring the ingredients together (not shown). The dough may be fermented at this stage. A preferred fermentation time is approximately 8 hours to develop desirable yeast activity and souring in the dough. The dough mass is then divided into small balls (ranging from about 100-160 gms each). The balls may be weighed for sizing purposes. More or less even or uneven weights may be desirable for different applications. The dough balls 100 are allowed to rise in trays on racks (for about 45 minutes at about 29° C.). The rising process is shown at FIG. 2. A steam proofer may be used with racks as shown in FIG. 2. Alternatively, a "traveling" or conveyor tray proofer may be used (not shown), retaining the same dough proofing ability, with improved efficiency.

Figure 3:
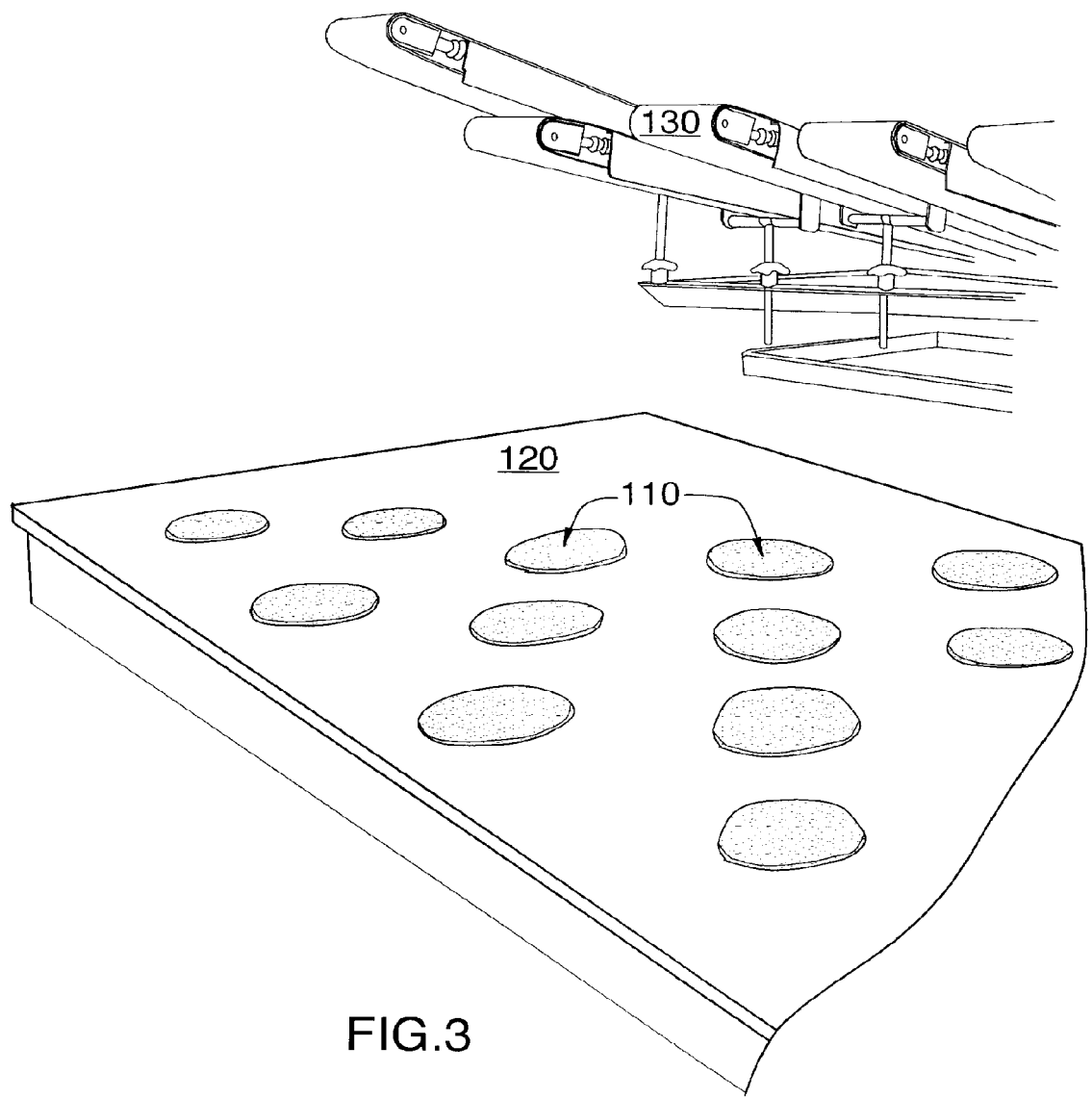
FIG. 3 is a view of a pressing station where round balls of dough are pressed into circular discs.

After rising, the dough balls are pressed or rolled against work surface 120 into circular discs 110. As shown in FIG. 3, a dough sheeting machine may be used to arrive at substantially circular/elliptical discs. The desired thickness of each disc (depending on the type of naan) may be approximately 2-5 mm, each disc being approximately 6-10" (15-26 cm) in diameter.

Figure 4:
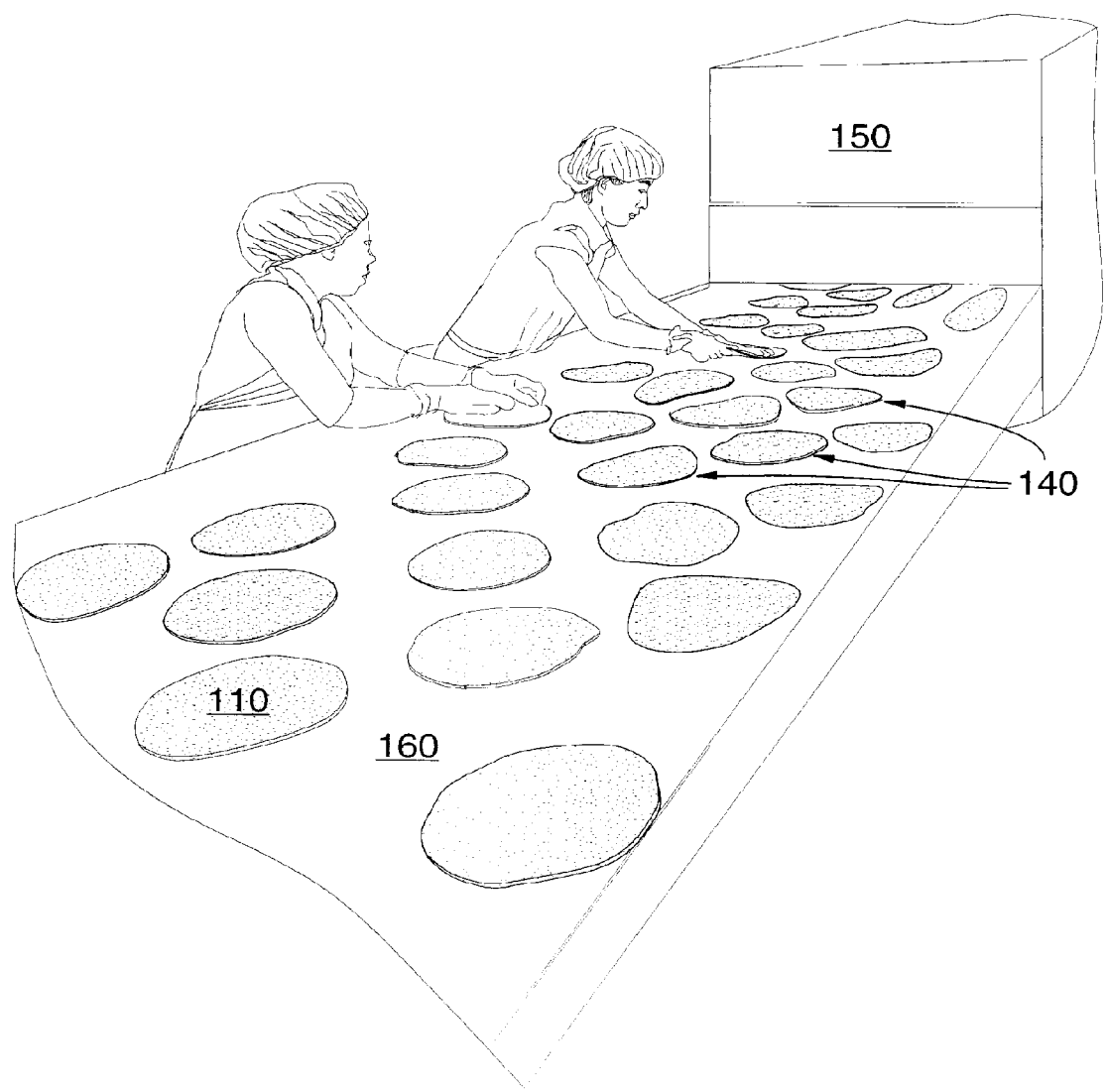
FIG. 4 is a view of a shaping station where circular discs of dough are stretched and shaped before baking.

The circular discs 110 may then be stretched in a second station 160 into shaped loaves 140 ready for baking. As shown in FIG. 4, the loaves may be hand-shaped, or mechanical shaping processes may be used (not shown). Preferably, the stretched thickness of each loaf of raw dough is approximately 1.5-3 mm.

The shaping process may also involve embossing the dough or impressing finger prints into the dough to make a deliberately uneven surface. This adds to the contrasting textures in the finished baked product.

Figure 5:
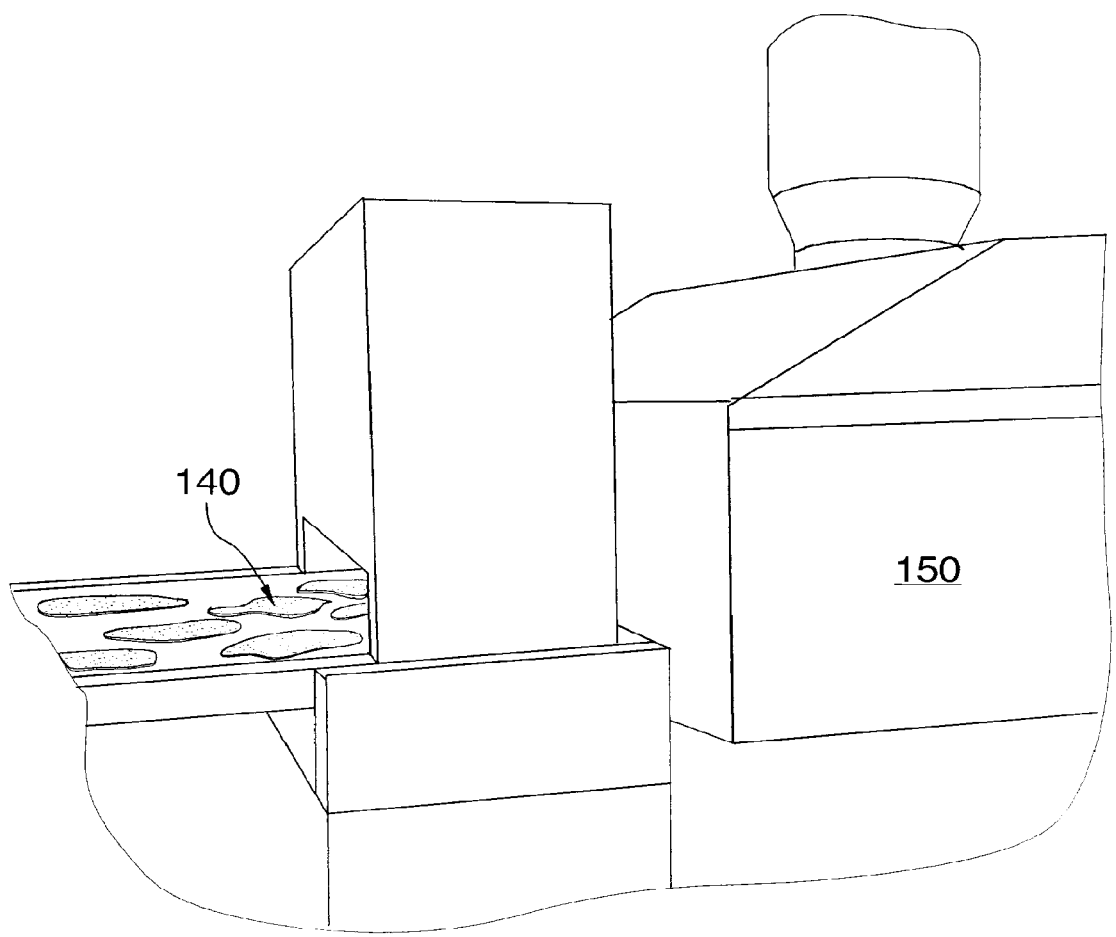
FIG. 5 is a side view of the entry point of the automatic oil spray prior to entering the oven for baking the naan bread loaves.
Figure 6:
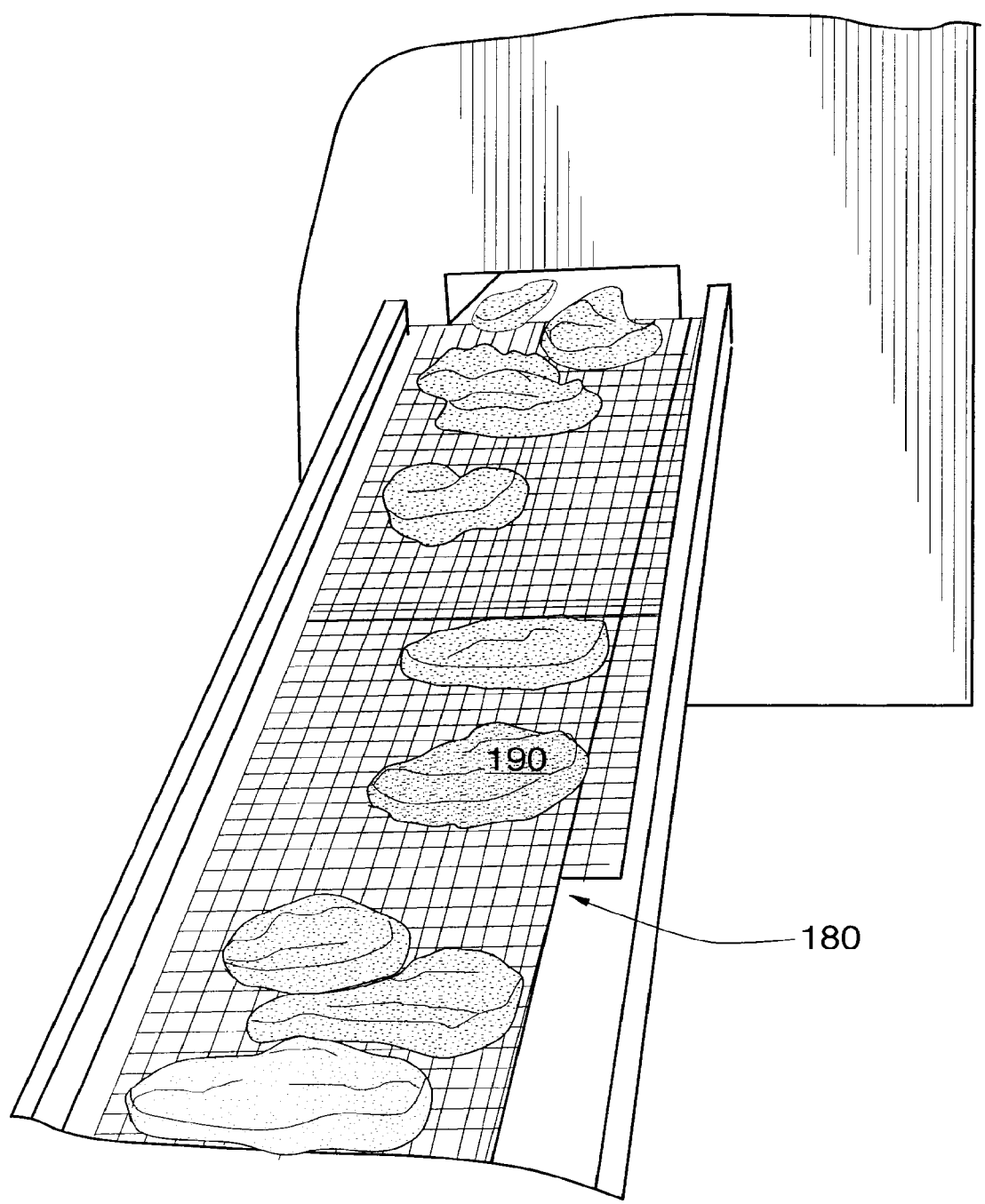
FIG. 6 is a view of the exit point of the oven for baking naan bread loaves before entering the spiral cooler prior to packaging.

As shown in FIG. 4, the prepping surface may be a conveyor leading to the oven conveyor 170. This conveyor 170 transports the pre-shaped loaves directly into and through the oven. FIG. 5 shows an entry point to the oven. The entry is quite small (only 4" (10 cm)) to provide just enough clearance for the conveyor bearing the thin loaves to enter the oven proper, while preventing heat escape.

Figure 8:
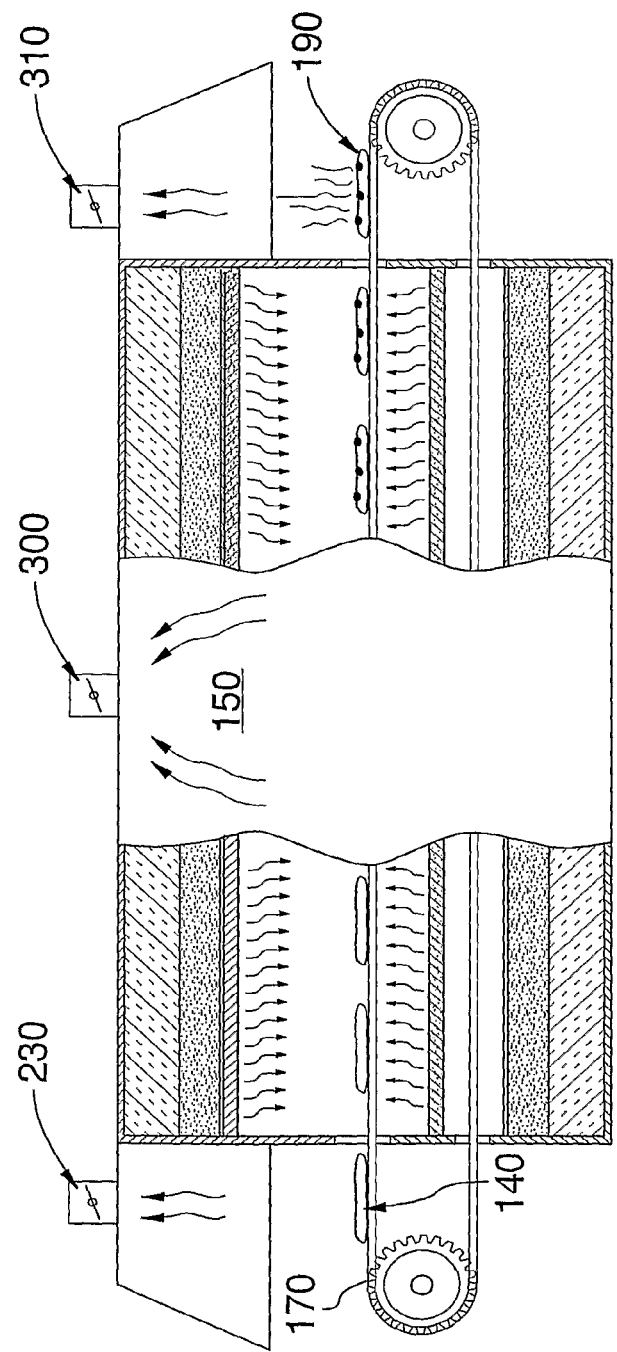
FIG. 8 is a diagram of oven operation showing top and bottom heating elements (burners) with simulated flow diagram of heat waves and exhaust fumes.
Figure 9:
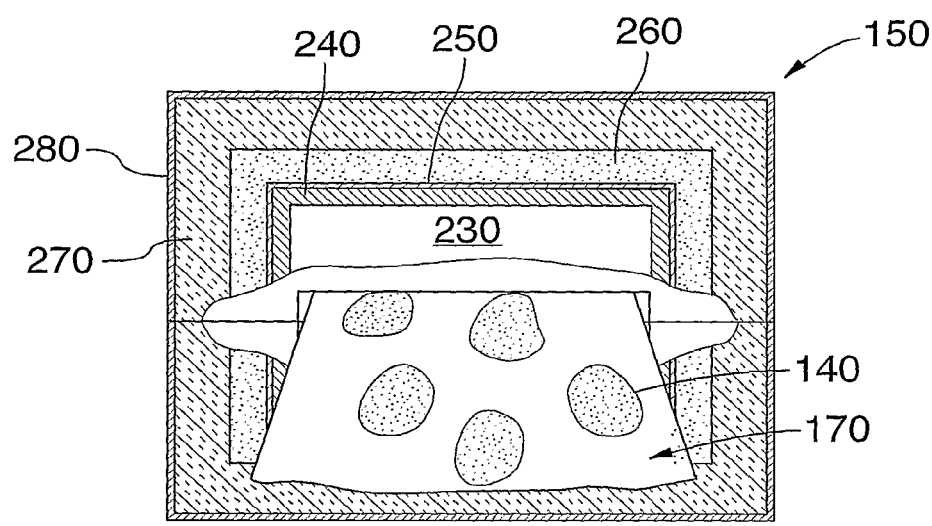
FIG. 9 is diagram of the oven construction showing layers of housing materials.

The structure of the oven 150 is best shown in the diagrams in FIGS. 8 and 9.

A special "traveling" (conveyor) tandoor gas oven 150 is preferably used. Gas is preferred for efficiency and the ability to generate very high temperature heating. A standard blower system is used to circulate heated air and exhaust fumes and smoke (not shown). Other oven arrangements may be possible. It may be possible, for instance, to use electric heating elements, or to combine gas and some other combustible heat source (e.g. wood chip or charcoal). Of critical importance is the ability to generate a heated oven environment in excess of 700° F. (370° C.). For naan baking, it is preferred that the arrangement of burners provide heat from below and above, simulating the heat pattern of the traditional tandoor oven. This contributes to better browning of the naan and simulates the heat "chimney" effect in a traditional tandoor. As shown in FIG. 8, an inlet exhaust 290, a combustion exhaust 300 and an outlet exhaust 310 may be provided. The heat generated bakes the loaves in the oven proper 230 with heat from above and below the loaves.

The conveyor in the "traveling" tandoor oven has specially-designed trays which in turn hold clay, granite or porcelain tiles, specially designed to withstand high temperatures (up to 1000° F.) and vibrations caused by traveling at various speeds (between approximately 2-80 ft/min.). Conveyor speed is preferably controllable by external controls (not shown).

In a preferred embodiment, the temperature of the oven is set at approximately 700° F. At a conveyor speed of 20-50 feet/minute, the baking time per naan is approximately 35-75 seconds, dependant on thickness and size of naan produced. The conveyor operated at this speed allows continuous production averaging about 4000-8000 naan per hour, dependant on baking time and size of product. One of the challenges in operating a conveyor oven for this purpose has been to find a temperature and baking time suitable to produce a high-quality, authentic naan having a desirable texture, size and taste, while taking advantage of the process efficiencies of the conveyor arrangement and production improvements.

As particularly shown in the diagram in FIG. 8, the tunnel of the oven may be a linear path. Alternatively, the entry and exit may be positioned proximate to each other, the conveyor operating in a loop formation, or some other arrangement.

Preferably, at the oven exit, the conveyor removes the baked naans 190 onto a separate conveyor 180 for delivery to a cooling area (not shown). Naan baked at 700° F. enters the cooling spiral at approximately 200° F., being cooled to ambient temperature (approximately 70° F.) before packaging. Post-cooling, the naan can be packaged at a packaging station and the temperature reduced still further for refrigerated or frozen storage (not shown).

It has been found that the present method allows naans to be pre-baked for resale as a re-heatable product for home use. The product, removed from its packaging, can be re-heated in a conventional oven, in a pan on a conventional stove top or by microwave. A few drops of water may be sprinkled on the surface of the naan prior to re-heating to re-hydrate the naan and improve the baking. If desired, the naan may be topped with various toppings such as roasted garlic, butter ghee, parmesan cheese, grilled roasted vegetables, or pizza ingredients may be added by the consumer and/or the surface brushed with olive oil.

The tandoor oven construction is particularly shown in FIG. 9. The oven cavity 230 is surrounded by stone cladding 240 (e.g. granite or another food-approved stone material). This is in turn supported by a carbon steel layer 250. A layer of sand 260 follows, which is a traditional insulator in tandoor ovens. Next, loosely-packed (12 lb/ft$^2$) rock wool 270 is used to further insulate. Finally, the structure is encased in stainless steel 280. This multi-layer structure of granite (clay, stone or porcelain) in combination with sand is believed to be unique among high-temperature conveyor ovens. The oven structure allows baking at 800° F. while containing the internal heat. Preferably, the exterior steel housing is maintained at a low temperature (less than 100° F.).

Preferably, the height of the baking cavity 230 is approximately 18" from the surface of the conveyor 170. The width of the tunnel is preferably approximately 56". The tunnel's length may vary, but a length around 20-30 ft has been found useful. The entry and exit portions may have reduced height to prevent heat escape (either part of the housing may be lowered downward to partially cover the entry and exit, or a separate heat shield may be provided in the form of inlet and exit hoods with Teflon® curtains (not shown).

The oven preferably further includes an exhaust fan fitted with oil separators to condense any airborne oil particles from the baking process (not shown).

The foregoing description illustrates only certain preferred embodiments of the invention. The invention is not limited to the foregoing examples. That is, persons skilled in the art will appreciate and understand that modifications and variations are, or will be, possible to utilize and carry out the teachings of the invention described herein. Accordingly, all suitable modifications, variations and equivalents may be resorted to, and such modifications, variations and equivalents are intended to fall within the scope of the invention as described and within the scope of the claims.

What is claimed is:
1. A method of making naan bread, comprising the steps of:
preparing a naan bread dough;
dividing and forming the dough into round balls;
rising the round balls of dough;

passing the risen balls through a dough sheeting machine to flatten the round balls into loaves comprising generally circular discs;

coating the loaves with oil;

stretching each disc into an irregular non-circular shaped loaf;

loading the loaves onto a conveyor comprising heated stone, granite, clay or porcelain tiles and carrying the loaves on the conveyor through an entry point of an oven into an insulated baking chamber having insulated walls to insulate an exterior surface of the oven from the insulated baking chamber, the insulated baking chamber being defined by an oven housing, the housing comprising an exterior stainless steel layer, an interior carbon steel layer, and an intermediate insulating layer between the exterior stainless steel layer and the interior carbon steel layer for maintaining an exterior surface of the housing at a temperature below 100° F.; and maintaining an oven environment of the insulated baking chamber at a temperature of at least 700° F. with gas burners disposed above and at least one heating element disposed below the loaves as they travel through the oven environment on the conveyor for a period of time between approximately 20 and approximately 50 seconds sufficient to bake the loaves until they have a visibly bubbled surface texture and a slightly scorched top surface.

2. The method of claim 1, wherein the preparing the naan dough further comprises fermenting the dough for approximately 8 hours.

3. The method of claim 1, wherein the stretching is done by hand.

4. The method of claim 1, wherein after the loaves have been baked, the method further comprises depositing the baked loaves from the conveyor onto a separate conveyor, and transporting the baked loaves through a cooling spiral to cool the loaves; and packaging the cooled loaves for sale as re-heatable naan bread.

5. The method of claim 1, wherein the gas burners disposed below the loaves is further disposed above the tiles passing through the insulated baking chamber during a return path to the entry point of the oven.

6. The method of claim 1, wherein after the loaves pass through the insulated baking chamber, the method further comprises discharging the baked loaves at an exit point of the oven before the tiles return to the entry point.

7. The method of claim 1, wherein after the loaves pass through the insulated baking chamber, the method further comprises the conveyor removing the baked loaves onto a separate conveyor.

8. The method of claim 1, wherein after the dough balls are flattened, the method further comprises shaping the flattened loaves by mechanical shaping.

9. The method of claim 1, wherein the method comprises loading the loaves onto the conveyor comprising heated granite tiles.

* * * * *

UNITED STATES PATENT AND TRADEMARK OFFICE
CERTIFICATE OF CORRECTION

PATENT NO. : 9,044,023 B2  Page 1 of 1
APPLICATION NO. : 13/040790
DATED : June 2, 2015
INVENTOR(S) : Sam Ajmera et al.

It is certified that error appears in the above-identified patent and that said Letters Patent is hereby corrected as shown below:

In The Claims

Claim 1, column 7, line 4: please delete "coating the loaves with oil;".

Claim 1, column 7, line 6: please insert after line 6 --coating the loaves with oil;--.

Signed and Sealed this
Twenty-third Day of August, 2016

Michelle K. Lee
*Director of the United States Patent and Trademark Office*